US012284327B2

(12) United States Patent
Schwartz

(10) Patent No.: US 12,284,327 B2
(45) Date of Patent: Apr. 22, 2025

(54) SYSTEM AND METHOD FOR SMART TV ANYWHERE

(71) Applicant: Isabella H. Schwartz, Ashburn, VA (US)

(72) Inventor: Isabella H. Schwartz, Ashburn, VA (US)

(*) Notice: Subject to any disclaimer, the term of this patent is extended or adjusted under 35 U.S.C. 154(b) by 103 days.

(21) Appl. No.: 17/992,393

(22) Filed: Nov. 22, 2022

(65) Prior Publication Data

US 2023/0171395 A1   Jun. 1, 2023

Related U.S. Application Data

(60) Provisional application No. 63/282,296, filed on Nov. 23, 2021.

(51) Int. Cl.
*H04N 13/368* (2018.01)

(52) U.S. Cl.
CPC ................ *H04N 13/368* (2018.05)

(58) Field of Classification Search
CPC .................................. H04N 13/368
USPC ........................................ 348/51
See application file for complete search history.

(56) References Cited

U.S. PATENT DOCUMENTS

| 10,558,264 | B1* | 2/2020 | Watson | H04N 13/156 |
| 2002/0123376 | A1* | 9/2002 | Walker | G07F 17/3244 |
| | | | | 463/11 |
| 2018/0061121 | A1* | 3/2018 | Yeoh | G06T 1/60 |
| 2021/0096802 | A1* | 4/2021 | Faaborg | G06F 3/012 |
| 2021/0272537 | A1* | 9/2021 | Mak | G06F 3/013 |
| 2022/0319453 | A1* | 10/2022 | Llull | G09G 3/3426 |

FOREIGN PATENT DOCUMENTS

| CA | 3065131 A1 * | 12/2018 | A63F 13/211 |
| WO | WO-2022256177 A1 * | 12/2022 | G02B 27/0093 |

* cited by examiner

*Primary Examiner* — Behrooz M Senfi
(74) *Attorney, Agent, or Firm* — Venable LLP

(57) ABSTRACT

The present teaching relates to dynamic content delivery. A changing field of view of a viewer is detected based on sensor data capturing information of the viewer at a source location, where the viewer is consuming content of a program on a first content display device. A pose of a second content display medium is determined based on the changing field of the view, where the second content display medium is to be used to display content to the viewer within the changing field of view. A content delivery mechanism is configured with respect to the pose of the second content display medium on which the content of the program is delivered to the viewer within the changing field of view of the viewer.

20 Claims, 11 Drawing Sheets

Lying down will not work align anymore and hurt eyes

SYSTEM AND METHOD FOR SMART TV ANYWHERE

CROSS REFERENCE TO RELATED APPLICATION

This application claims the benefit of U.S. Provisional Patent Application No. 63/282,296, filed Nov. 23, 2021, the contents of which are hereby incorporated by reference in its entirety.

BACKGROUND

1. Technical Field

The present teaching generally relates to user machine interface. More specifically, the present teaching relates to intelligent TV display.

2. Technical Background

With the development of electronics and display technologies in the last few decades, the ways that people can entertain have been steadily improving. Examples include that TVs continuously become thinner and thinner with higher and higher resolution and video-on-demand almost replaced the traditional broadcast TVs. Due to dramatically increased varieties of content that can be viewed via a TV screen, people can now enjoy much more than what is possible in the past. Families stay home more frequently to entertain without having to go to different sources, e.g., video renting places or movie theaters, to access entertainment content. FIG. 1A shows a typical scene of a family gathering to watch entertainment content displayed on their family TV. As shown, a typical set up for such a family gathering is that there is a TV 100 and members of the family sit in front of the TV (on a couch or on the floor).

Although the TV device and the content that can be displayed on a TV screen have significantly improved in the last the decades, the setting in which people entertain via TV has not changed much at all. As shown in FIG. 1A and FIG. 1B, the setting in which people entertain via TV device has not changed at all. Viewers continue to have to sit in front of the physical TV device so that the TV screen is within their field of view. Such a setting sometimes is not desirable. For example, it is commonly known that people need to change the way they sit when their bodies become tired after in a same position for an extended period. For example, after sitting straight up for a while, people sometimes lie down on couch or floor just to change the body position. This is especially so when people are watching some long program displayed on a TV screen. However, whenever a viewer changes his/her position, he/she still needs to face the TV screen in order to ensure that the TV is still in the field of view. This is shown in FIG. 1C. Another frequently occurring situation is that different members of a family may desire to watch different programs and some TVs allow to split a screen into different regions and each region is used to display a different program. This is shown in FIG. 1D, where the display screen is split into three regions, 110, 120, and 130, displaying program 1, program 2, and program 3, respectively. Although this achieves what is desired, the split regions on the screen usually have much smaller real estate so that the images are small as well, affecting quality.

Thus, there is a need for improved ways to entertain with more comfort and flexibility.

SUMMARY

The teachings disclosed herein relate to methods, systems, and programming for information management. More particularly, the present teaching relates to methods, systems, and programming related to hash table and storage management using the same.

In one example, a method, implemented on a machine having at least one processor, storage, and a communication platform capable of connecting to a network for dynamic content delivery. A changing field of view of a viewer is determining based on sensor data from one or more sensors that capture information of the viewer at a source location, where the viewer is initially consuming content of a program on a first content display device. A pose of a second content display medium is set up in accordance with the changing field of the view of the viewer, where the second content display medium is to be used to display the content to the viewer within the changing field of view. A content delivery mechanism is configured with respect to the pose of the second content display medium. The content of the program is presented on the second content display medium so that the content is delivered to the viewer in accordance with the changing field of view of the viewer.

Other concepts relate to software for implementing the present teaching. A software product, in accordance with this concept, includes at least one machine-readable non-transitory medium and information carried by the medium. The information carried by the medium may be executable program code data, parameters in association with the executable program code, and/or information related to a user, a request, content, or other additional information.

Another example is a machine-readable, non-transitory and tangible medium having information recorded thereon for dynamic content delivery. The information, when read by the machine, causes the machine to perform various steps. A changing field of view of a viewer is determining based on sensor data from one or more sensors that capture information of the viewer at a source location, where the viewer is initially consuming content of a program on a first content display device. A pose of a second content display medium is set up in accordance with the changing field of the view of the viewer, where the second content display medium is to be used to display the content to the viewer within the changing field of view. A content delivery mechanism is configured with respect to the pose of the second content display medium. The content of the program is presented on the second content display medium so that the content is delivered to the viewer in accordance with the changing field of view of the viewer.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

The present teaching aims to address the deficiencies of the current state of art that requires a viewer to always position according to a fixed location of a display screen. Instead, the present teaching enables content display on a projection surface determined according to the dynamic position of a viewer. This is achieved by monitoring the pose of a user's face, accordingly determining a projection surface in the user's field of view, and configuring the projection equipment to facilitate displaying of content on the projection surface positioned and oriented in a way is in the user's field of view.

Figure 1A:
FIGS. 1A-1D provide examples of traditional ways of entertainment via IV.
Figure 1B:
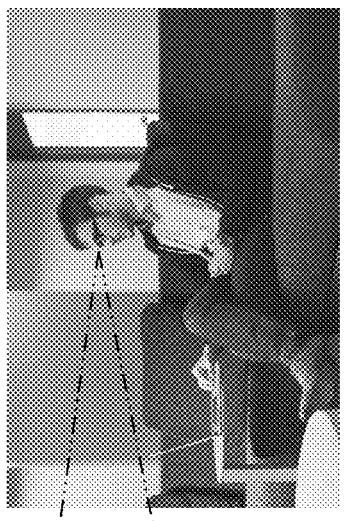
Figure 1B:
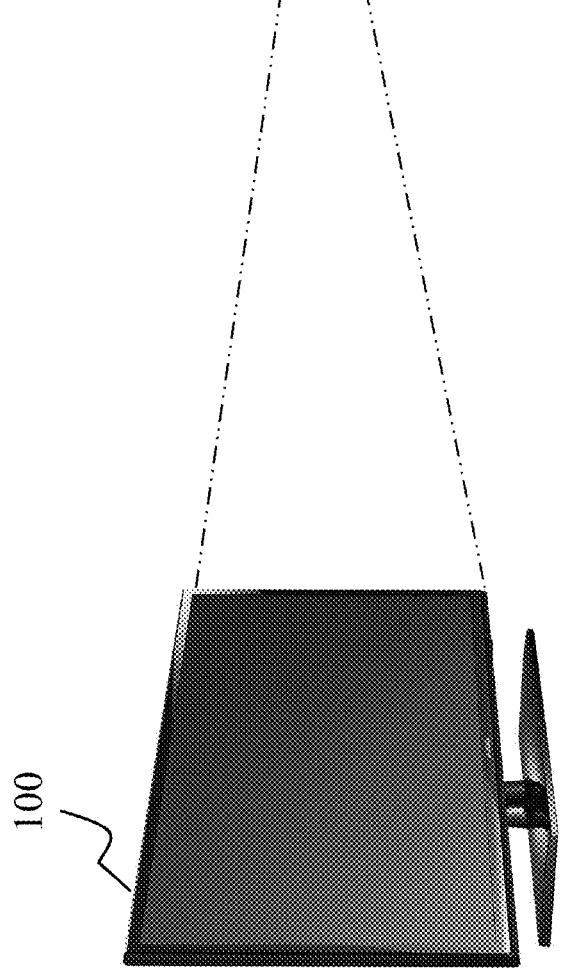
Figure 1C:
Figure 1D:
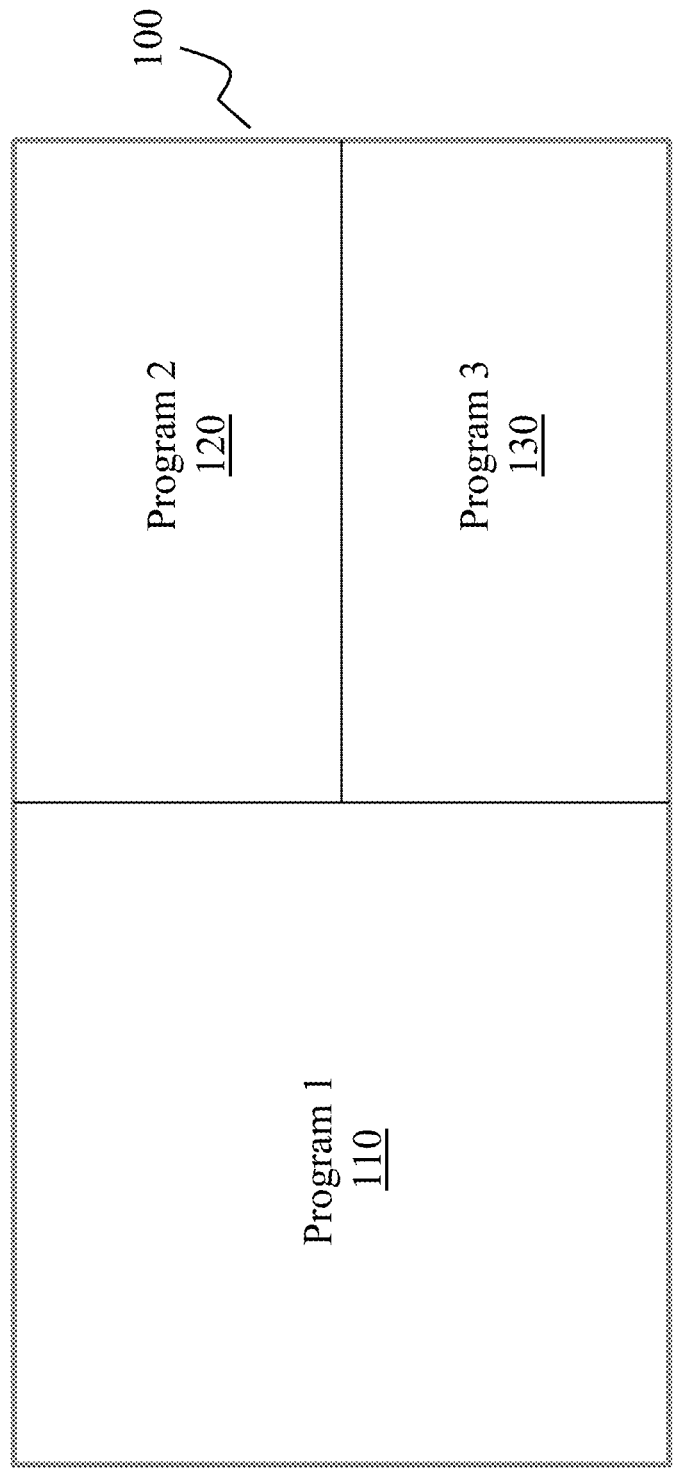
Figure 2:
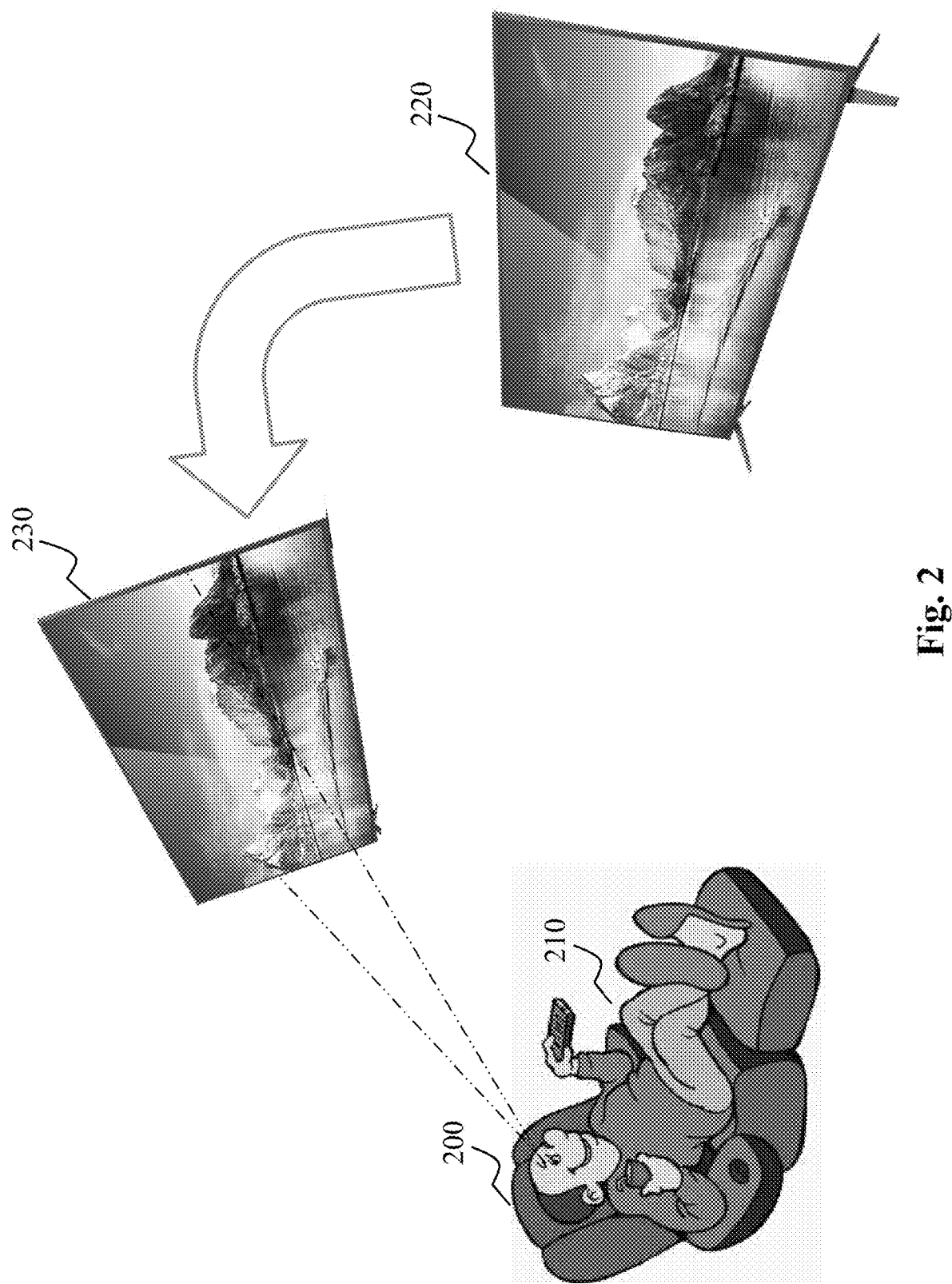
FIG. 2 depicts an exemplary room set-up that enables automatic determination of a projection screen with a pose determined based on automatically detected orientation of a user, in accordance with an exemplary embodiment of the present teaching.

FIG. 2 depicts an exemplary room set-up that enables automatic determination of a projection screen with a pose determined based on automatically detected orientation of a user, in accordance with an exemplary embodiment of the present teaching. In this illustration, a viewer 210 sitting in a chair 200, watching a TV 220. When the viewer changes his position in the chair, e.g., lowering the back support of the chair, the TV 220 is no longer in the field of view of the viewer. In order to accommodate the new field of view of the viewer, the orientation of the viewer's face is estimated so that a new projection surface 230 is automatically determined that is within the new field of view of the user. The purpose of estimating the new projection surface is for projecting the content of the TV within the new field of view so that the viewer in the new position can continue to watch the content.

Figure 3:
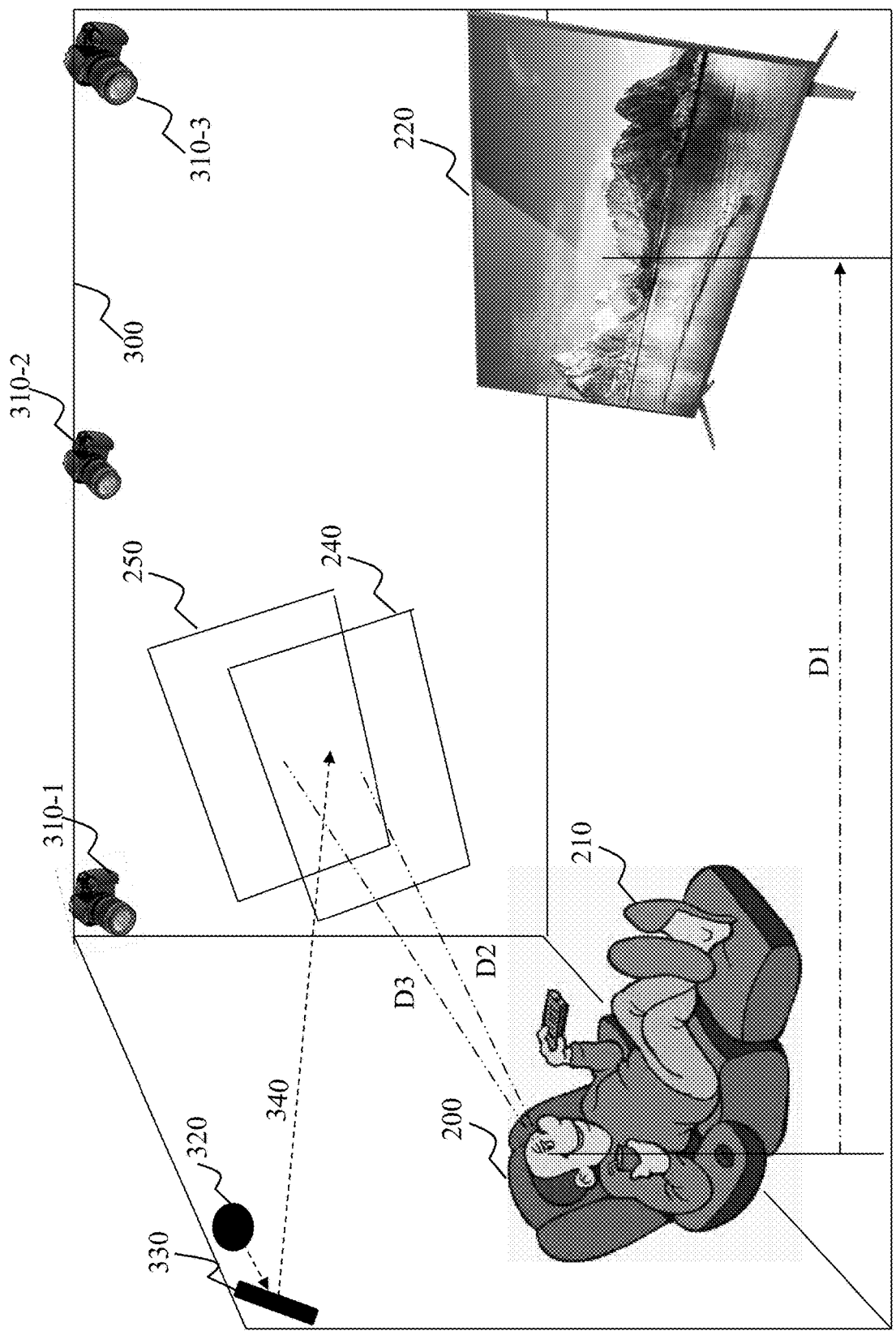
FIG. 3 depicts an exemplary room set up for projecting content of a TV program to a position in space determined based on the face orientation of a viewer, in accordance with an embodiment of the present teaching.

FIG. 3 depicts an exemplary room set up for projecting content of a TV program to a projection surface determined based on the face orientation of a viewer, in accordance with an embodiment of the present teaching. In this figure, a room 300 is installed a plurality of sensors 310-1, 310-2, ..., 310-3. Each of the sensors may be a camera or a depth sensor and they may be installed around the room so that a viewer's movement can be observed, face of the viewer may be located, and the orientation of the face may be estimated from the sensor data. Each sensor may be calibrated so that any object detected from sensor data may have a corresponding 3D coordinates in the room. According to the sensor data, the distance between the user and the TV 220 may be estimated and can be used in determining the projection surface 240 or 250 in order to, e.g., determine the distance, e.g., D2 or D3, between the user 210 and a corresponding projection surface.

In some exemplary embodiments, to project content of a program onto a projection surface, the room is configured to have a projector 320 and a reflection surface 330 and each can be flexibly configured as to their poses in order to ensure that the projector 320 will cast the signal rays to the reflection surface 330 that will then reflect signal reflection rays 340 to the projection surface 240 or 250.

Figure 4:
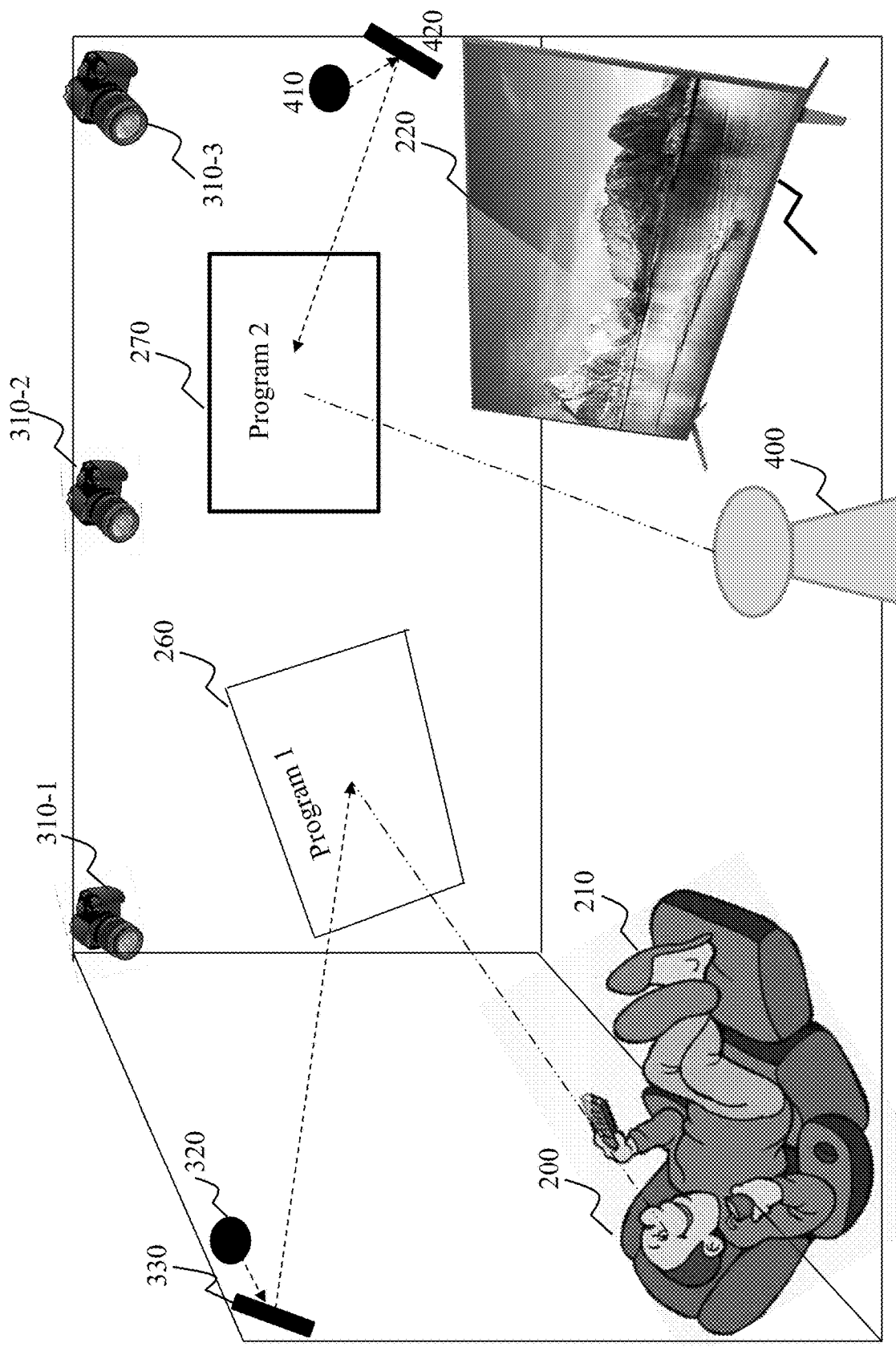
FIG. 4 depicts a different exemplary set-up in a room that enables projection of different TV content to different locations for different users, in accordance with an exemplary embodiment of the present teaching.

FIG. 4 depicts a different exemplary set-up in a room that enables projection of different TV content to different projection surfaces within different fields of view of different users, in accordance with an exemplary embodiment of the present teaching. In this configuration, in addition to the viewer 210, there is a second viewer 400 who has a different field of view than that of the viewer 210. To accommodate a separate projection of content of a different program (or content of the same program but projecting to a second field of view), there are additional projector 410 and reflection surface 420 so that projection signal rays hitting the reflection surface 420 will get reflected to projection surface 270 that is within the field of view of the second viewer 400, estimated by analyzing sensor data to detect the location and orientation of the face of the second viewer 400.

In some embodiments, in enabling flexible display of content according to dynamically detected viewer's fields of view, a mechanism may be provided that interfaces with users so that the flexible projection of content in accordance with a change of the field of view of a user is activated by, e.g., a request from a viewer. Such a request may also serve as an locator to a region where the viewer who requests the functionality is. This is illustrated in FIGS. 2-4, where a viewer who can issue a request for the functionality via a, e.g., remote control device, may hit a button on the remote control to activate the flexible display functionality and the remote control device may then transmit a signal to the control mechanism for the functionality, e.g., located in TV 220. The location of the remote control device may be recognized based on the received signal so that appropriate sensors installed in the room to facilitate the present teaching may then be directed to focus on the location to collect sensor data needed to allow a detection of the pose of a projection surface within the field of view of the viewer. This is shown in FIGS. 3-4, where multiple cameras deployed in the room may be dynamically configured to monitor the area in the room from where the requesting signal is transmitted, i.e., which is where the viewer located.

Figure 5:
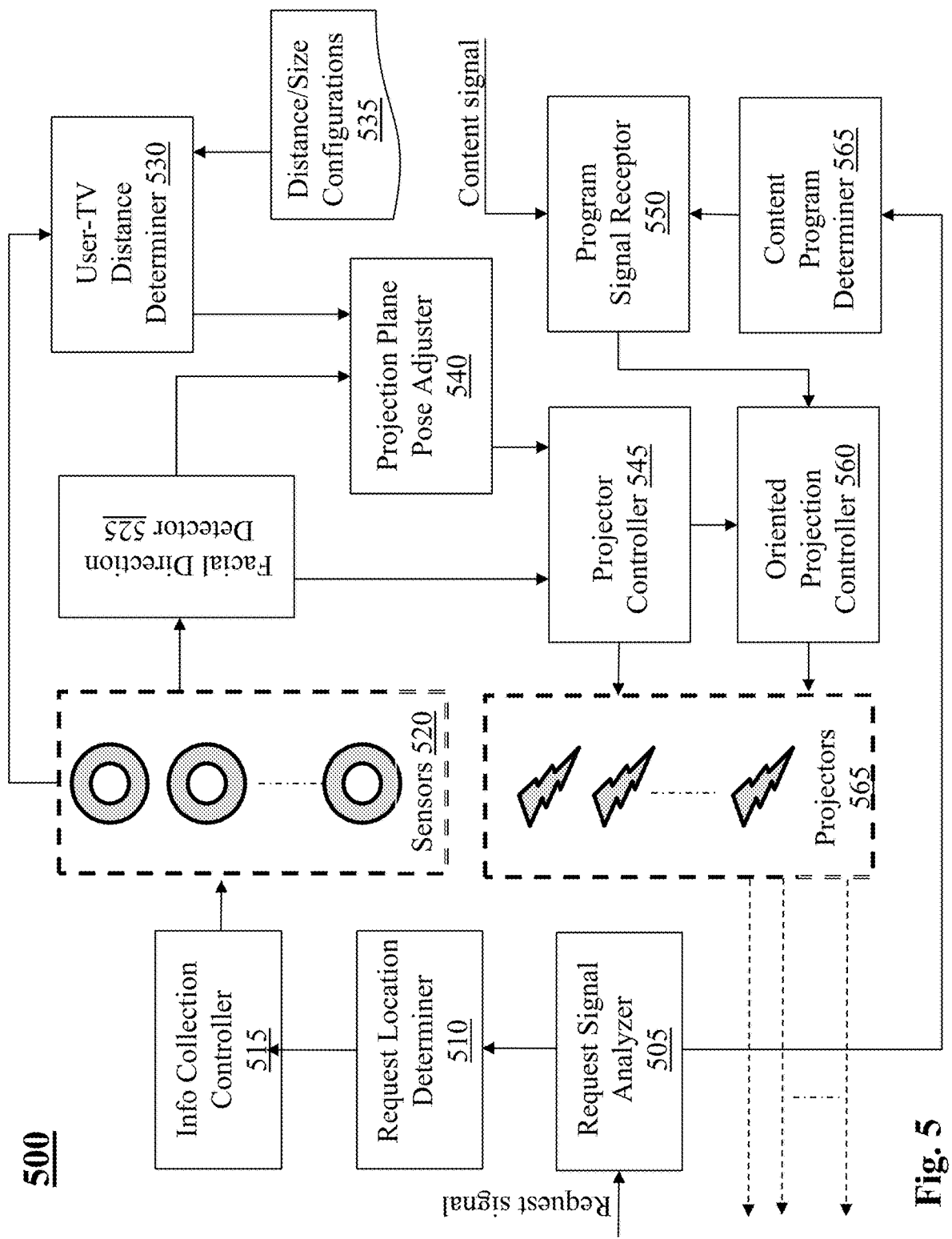
FIG. 5 depicts an exemplary high-level system diagram of a mechanism 500 for intelligent dynamic content display, in accordance with an exemplary embodiment of the present teaching.

The sensors directed to the region where the requesting viewer is are then collecting information of region so that such collected sensor information can be used to estimate the current (or changed) field of view of the viewer based on, e.g., face of the viewer detected from the sensor data, which can then be used to determine an appropriate projection surface on which the content of the program that the viewer is (or is going to be) watching is projected. FIG. 5 depicts an exemplary high-level system diagram of a mechanism 500 for intelligent dynamic content display, in accordance with an exemplary embodiment of the present teaching. In this illustrated embodiment, the mechanism 500 comprises three sub-systems, including a preliminary analysis portion, a display pose determination portion, and a dynamic projection portion.

The preliminary analysis portion is for determining the focal area and includes a request signal analyzer 505, a request location determiner 510, an information collection controller 515. As discussed herein, a request from a viewer to invoke the flexible display of content in a dynamically changing field of view is analyzed in this part of the system to determine a region of interest in the 3D space where the viewer is located. The request signal analyzer 505 is provided to parse the request signal and extract, e.g., relevant information from the request that can be used to determine the direction/location of where the signal is coming from. The analysis result is then provided to the request location determiner 510 so that a specific region in the 3D space of the room where the requesting viewer is may be determined. Based on the location of the viewer for which flexible display of content is to be performed, the information collection controller 515 is to accordingly configure at least some of the sensors 520 deployed in the room to target at the estimated location of the viewer so that necessary information may be collected from such sensors to facilitate the computation to determine the dynamic field of view of the viewer.

The display pose determination portion is for estimating the dynamic projection surface on which content is to be projected for the viewer and parameters thereof. For example, exemplary parameters include the size of the projection surface (related to a desired distance between the viewer and an estimated projection surface) and the pose (e.g., 6 degrees of freedom including 3D location and orientation) of the projection surface. This portion includes a facial direction detector 525, a user-TV distance determiner 530, and a projection plane size/pose adjuster 540. According to the present teaching, the facial direction detector 525 is for detecting, in the region of interest determined based on the request signal, presence of a viewer and his/her face which facilitate a determination of the projection surface or plane. The user-TV distance determiner 530 is provided to estimate what would be the distance between the viewer who requests to flexibly display content of a program the viewer is watching and the dynamically determined projection surface. In some embodiments, this distance may be estimated based on a known distance between the viewer and a physical display device such as a TV in order to maintain the same distance.

In some embodiments, the distance may be adjusted in proportion to the size of the projection surface. For instance, if the projection surface is of a fixed size larger than the TV screen, then the distance between the viewer and the projection surface may be proportionally larger than that between the viewer and the physical TV device. Similarly, if the projection surface is smaller than the TV screen, then the distance between the viewer and the projection surface may be proportionally smaller than that between the viewer and the physical TV device. Such general guidelines on proportionality may be specified in a distance/size configuration storage 535 as the default estimate of a distance between the viewer and the projection surface, which may be overridden by the viewer via, e.g., manipulation of the remote control via, e.g., increasing or decreasing the distance of the projection surface from the viewer.

The estimated or adjusted distance between the viewer and the projection surface may then be used by the projection plane pose adjuster 540 to determine the position of the projection plane and pose thereof. In some embodiments, the projection surface may be adjusted to be centered at a 3D coordinates (horizontal, vertical, and depth) in the room within the field of the view of the viewer so that the distance between the viewer's face and the 3D coordinate equals the estimated distance. The projection plane pose adjuster 540 may also further proceed to determine the additional parameters of a desired pose of the projection surface, which include a pitch, a yaw, and a roll of the projection surface. To achieve dynamic display of content in the field of view of the viewer, the parameters need to be determined in such a way that the projection surface oriented accordingly has its norm in a direction substantially in alignment of the rays of eyesight of the viewer. Thus, the pose of the projection surface is determined based on the distance to the viewer and the facial features of the viewer. For instance, 3D coordinates of three points from the face of the viewer can be detected based on, e.g., multiple images of the viewer (e.g., from multiple calibrated cameras based on, e.g., stereo) and then used to estimate a 3D surface representing the viewer's frontal face. Then the projection surface may be adjusted to be parallel to the surface representing the viewer's frontal face.

The third sub-portion (dynamic projection portion) of the mechanism 500 is for dynamically projection content on a dynamically adjusted projection surface. This portion comprises a content program determiner 565, a program signal receptor 550, a projector controller 545, and an oriented projection controller 560. The content program determiner 565 is for determining the source of the content from where signals are obtained for projection. Such a source may be determined based on the signal from the remote control, which may, e.g., has an indication of a channel (e.g., Netflix) of information and a program that the viewer is currently watching (e.g., movie "Father of a Bride"). Based on the determined source of content from the content program determiner 565, the program signal receptor 550 gathers, e.g., via wireless means or otherwise, the signals representing the content of the program from its source and sends to the oriented projection controller 560 for projection.

The projector controller 545 is provided for selecting one of the projectors 565 deployed in the room that is appropriate for the viewer with respect to the projection surface estimated therefrom. As discussed herein and shown in FIG. 4, each projector, say 320 in FIG. 4, there is a corresponding reflection surface 330 through which the lights projected on it by the projector 320 are reflected according to a configured angle. Thus, the projector controller 545 is also provided for adjusting the poses of the projector 320 and the reflection surface 330 in accordance with the pose of the projection surface 260 to ensure that the lights reflected by the reflection surface will reach the projection surface 260. That is, the projector 320 and the reflection surface 330 are adjusted or controlled to have their respective poses that allow the signals to be projected by the projector 320 onto the reflection surface 330 and then be reflected to the projection surface 260, as shown in FIG. 4.

Once an appropriate projector and its corresponding reflection surface are selected and configured with parameters to allow proper projection of signals onto the projection surface 260, the oriented projection controller 560 is provided to receive the signals relating to the content program from the content signal receptor 550 and then control the selected projector 320 to emit signals to its corresponding reflection surface 330, which then reflect the signals to the room to reach the projection surface.

Figure 6:
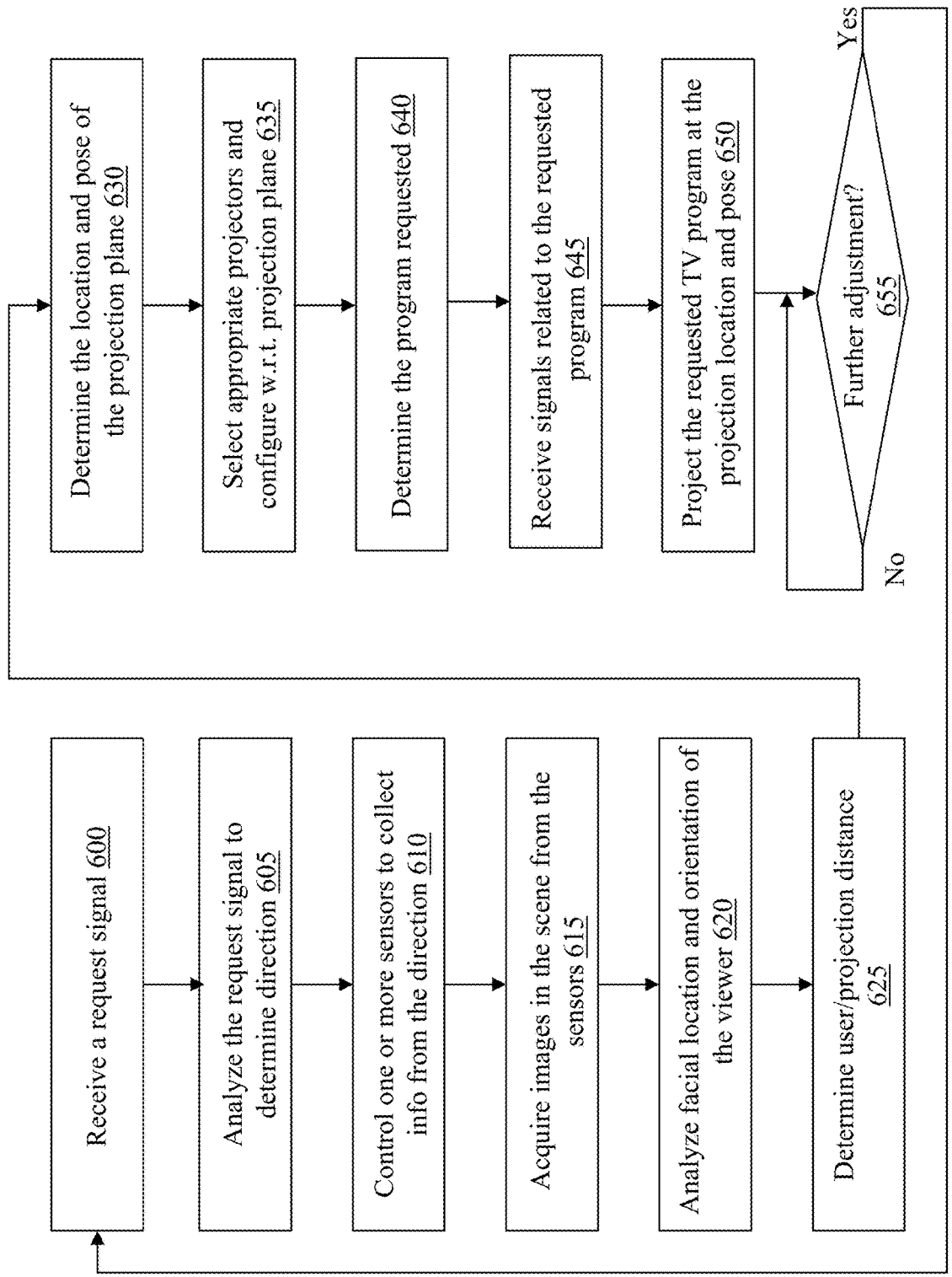
FIG. 6 is a flowchart of an exemplary process of a mechanism for intelligent dynamic content display, in accordance with an exemplary embodiment of the present teaching.

FIG. 6 is a flowchart of an exemplary process of the mechanism 500 for intelligent dynamic content display, in accordance with an exemplary embodiment of the present teaching. When a request signal is received, at 600, from a viewer (e.g., via a remote control device), the request signal analyzer 505 analyzes, at 605, the request signal to determine the source of the signal in the room and the request location determiner 510 infers a location of the viewer who desires to invoke the functionality of flexible display of content within the field of the view of the viewer. Based on the inferred location of the viewer, the information collection controller 515 controls, at 610, one or more sensors deployed in the room so that sensor data related to the location are acquired at 615.

To determine an appropriate projection surface for displaying content within the field of the view of the viewer, the sensor data acquired from the selected sensors about the location of the viewer are analyzed by the facial location detector at 620 to, e.g., extract facial features of the viewer and the orientation of the face. The user-TV distance determiner 530 determines, at 625, a distance between the viewer and a projection surface. In some embodiments, the distance is determined based on the physical distance between the viewer and a physical display device such as a TV. In some embodiments, the distance may be determined in consideration of the physical limitations of the room. Based on the viewer's face location, orientation, and the distance between the viewer and a dynamically determined projection surface, the projection plane pose determiner 540 determines, at 630, the location and pose of the projection surface. To ensure that content signals can be correctly projected onto the projection surface, the projector controller 545 selects, at 635, projector(s) and corresponding reflection surface(s) appropriate with respect to the projection surface and its pose. The operating parameters (such as projection angle and/or reflection angle, etc.) of the selected projector and corresponding reflection surface are then accordingly configured with respect to the pose of the projection surface.

To allow content of the program that the viewer is watching to be displayed on the dynamically determined projection surface via the accordingly configured projector and reflection surface, the content program determiner 565 determines, at 640, the source of the content to be displayed on the projection surface and the program signal receptor 550 accordingly receives, at 645, the signals representing the program content to be displayed to the viewer via the projection surface and forwards such signals to the oriented projection controller 560, which then projects, at 650, the received signals via the selected projector 320 so that the signals may be reflected via the reflection surface 330 onto the projection surface so that content of the program that the viewer is viewing is displayed thereon. Once the content is displayed on the projection surface, the mechanism 500 may continue to monitor, at 655, to see if the viewer requested another adjustment. If a further adjustment is requested, the process returns to step 600 to receive a request signal from the viewer to adapt the display to a new field of view of the user according to a new position of the viewer. In this manner, the content of a program that a viewer is watching may be displayed dynamically onto a projection plane appropriate to the viewing angle of the viewer to provide improved comfort to the viewer.

The present teaching focuses on a method and system for dynamically determining a projection surface onto which content being viewed by a viewer on a physical device may be displayed so that a viewer may change his/her position and pasture yet still be able to watch the content flexibly displayed on the projection surface adapted with respect to a field of view determined with respect to the position of the viewer. To enable flexible configuration of the projection surface, the room is also to be provided with configuration support that allows the four corners of the projection surface to move around according to configuration to achieve a certain position and pose. For instance, a room may provide multiple tracks that can be used to connect different corners of the projection surface and that may be controlled to move different corners of the projection surface so that the orientation and position of the projection surface may achieve a certain configuration.

Figure 7:
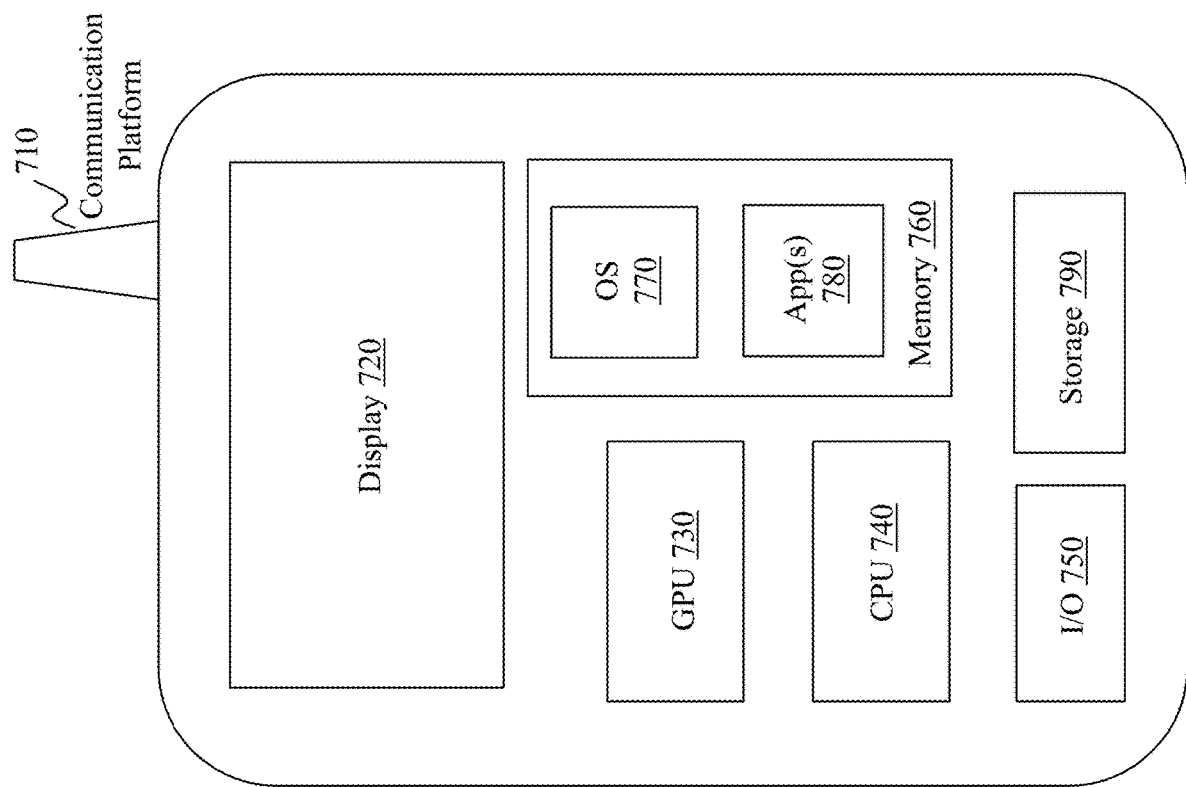
FIG. 7 is an illustrative diagram of an exemplary mobile device architecture that may be used to realize a specialized system implementing the present teaching in accordance with various embodiments.

FIG. 7 is an illustrative diagram of an exemplary mobile device architecture that may be used to realize a specialized system implementing the present teaching in accordance with various embodiments. In this example, the user device on which the present teaching may be implemented corresponds to a mobile device 700, including, but not limited to, a smart phone, a tablet, a music player, a handled gaming console, a global positioning system (GPS) receiver, and a wearable computing device, or in any other form factor. Mobile device 700 may include one or more central processing units ("CPUs") 740, one or more graphic processing units ("GPUs") 730, a display 720, a memory 760, a communication platform 710, such as a wireless communication module, storage 790, and one or more input/output (I/O) devices 750. Any other suitable component, including but not limited to a system bus or a controller (not shown), may also be included in the mobile device 700. As shown in FIG. 7, a mobile operating system 770 (e.g., iOS, Android, Windows Phone, etc.), and one or more applications 780 may be loaded into memory 760 from storage 790 in order to be executed by the CPU 740. The applications 780 may include a user interface or any other suitable mobile apps for information analytics and management according to the present teaching on, at least partially, the mobile device 700. User interactions, if any, may be achieved via the I/O devices 750 and provided to the various components connected via network(s).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 8:
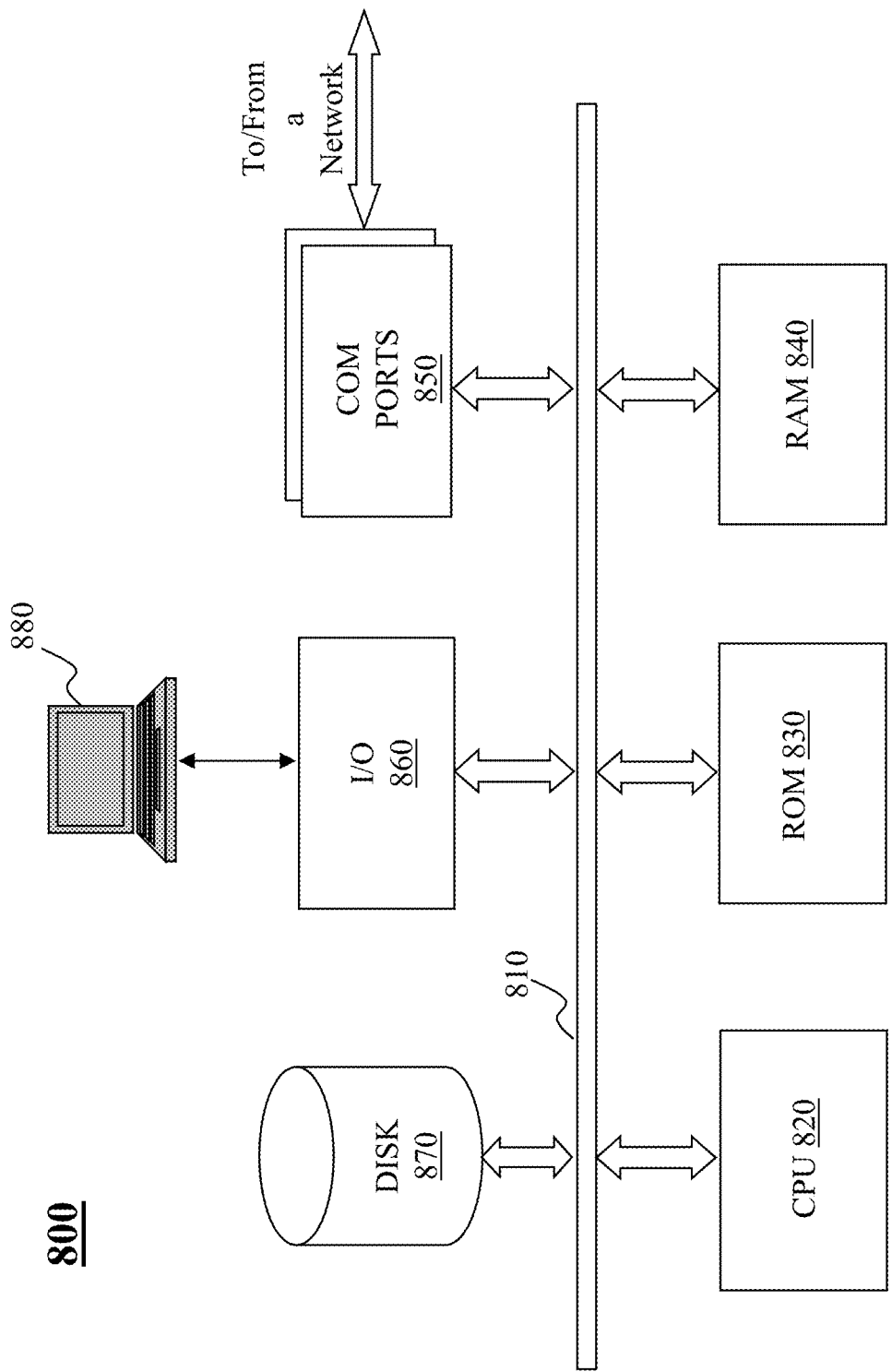
FIG. 8 is an illustrative diagram of an exemplary computing device architecture that may be used to realize a specialized system implementing the present teaching in accordance with various embodiments.

FIG. 8 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 800 may be used to implement any component or aspect of the framework as disclosed herein. For example, the information analytical and management method and system as disclosed herein may be implemented on a computer such as computer 800, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 800, for example, includes COM ports 850 connected to and from a network connected thereto to facilitate data communications. Computer 800 also includes a central processing unit (CPU) 820, in the form of one or more processors, for executing program instructions. The exemplary computer platform includes an internal communication bus 810, program storage and data storage of different forms (e.g., disk 870, read only memory (ROM) 830, or random-access memory (RAM) 840), for various data files to be processed and/or communicated by computer 800, as well as possibly program instructions to be executed by CPU 820. Computer 800 also includes an I/O component 860, supporting input/output flows between the computer and other components therein such as user interface elements 880. Computer 800 may also receive programming and data via network communications.

Hence, aspects of the methods of dialogue management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method implemented on at least one processor, a memory, and a communication platform for dynamic content delivery, comprising:
determining a changing field of view of a viewer based on sensor data from one or more sensors that capture information of the viewer at a source location, wherein the viewer is initially consuming content of a program on a first content display device;
setting up a pose of a second content display medium in accordance with the changing field of the view of the viewer, wherein the second content display medium is to be used to display the content to the viewer within the changing field of view;
selecting one of one or more projectors with respect to the pose of the second content display medium;
adjusting the pose of the selected projector based on the pose of the second content display medium; and
delivering the content of the program on the second content display medium via the selected projector by projecting the content to the viewer in accordance with the changing field of view of the viewer.

2. The method of claim 1, wherein the source location is determined by:
receiving a signal instructing to display the content in accordance with dynamically changing field of view of the viewer;
analyzing the signal to determine the source location from where the signal is transmitted by the viewer.

3. The method of claim 1, wherein
the first content display device is a television; and
the second content display medium is a projection surface.

4. The method of claim 1, wherein the content delivery mechanism is a projector, that is configured to transmit signals representing the content to a reflection surface that reflect the signals projected thereon.

5. The method of claim 1, wherein the step of determining comprises:
receiving the sensor data from the one or more sensors;
identifying facial features of the viewer from the sensor data;
determining a face orientation of the viewer based on the facial features; and
estimating the changing field of view of the viewer based on the face orientation of the viewer.

6. The method of claim 5, wherein the step of setting up a pose of a second content display medium comprises:
determining a distance between the viewer and the second content display medium;
selecting a location for the second content display medium based on the source location, the distance, and the changing field of view; and
configuring the pose of the second content display medium in accordance with the face orientation of the viewer and the changing field of view, wherein the second content display medium is configured to be substantially parallel with the face orientation of the viewer.

7. The method of claim 1, further comprising:
adjusting the pose of a reflection surface associated with the selector projector based on the pose of the second content display medium to ensure that when
the selected projector transmits signals determined based on the content to the reflection surface, the reflection surface reflects the signals projected thereon in accordance with the angle
to the second content display medium so that the content is visible to the viewer on the second content display medium.

8. Machine readable non-transitory medium having information recorded thereon for dynamic content delivery, wherein the information, when read by the machine, causes the machine to perform the following steps:
determining a changing field of view of a viewer based on sensor data from one or more sensors that capture information of the viewer at a source location, wherein the viewer is initially consuming content of a program on a first content display device;
setting up a pose of a second content display medium in accordance with the changing field of the view of the viewer, wherein the second content display medium is to be used to display the content to the viewer within the changing field of view;
selecting one of one or more projectors with respect to the pose of the second content display medium;
adjusting the pose of the selected projector based on the pose of the second content display medium; and
delivering the content of the program on the second content display medium via the selected projector by projecting the content to the viewer in accordance with the changing field of view of the viewer.

9. The medium of claim 8, wherein the source location is determined by:
receiving a signal instructing to display the content in accordance with dynamically changing field of view of the viewer;
analyzing the signal to determine the source location from where the signal is transmitted by the viewer.

10. The medium of claim 8, wherein
the first content display device is a television; and
the second content display medium is a projection surface.

11. The medium of claim 8, wherein the content delivery mechanism is a projector, that is configured to transmit signals representing the content to a reflection surface that reflect the signals projected thereon.

12. The medium of claim 8, wherein the step of determining comprises:
receiving the sensor data from the one or more sensors;
identifying facial features of the viewer from the sensor data;
determining a face orientation of the viewer based on the facial features; and
estimating the changing field of view of the viewer based on the face orientation of the viewer.

13. The medium of claim 12, wherein the step of setting up a pose of a second content display medium comprises:
determining a distance between the viewer and the second content display medium;
selecting a location for the second content display medium based on the source location, the distance, and the changing field of view; and
configuring the pose of the second content display medium in accordance with the face orientation of the viewer and the changing field of view, wherein the second content display medium is configured to be substantially parallel with the face orientation of the viewer.

14. The medium of claim 8, wherein the medium, when read by the machine, further causes the machine to perform the step of
adjusting the pose of a reflection surface associated with the selector projector based on the pose of the second content display medium to ensure that when
the selected projector transmits signals determined based on the content to the reflection surface, the reflection surface reflects the signals projected thereon in accordance with the angle
to the second content display medium so that the content is visible to the viewer on the second content display medium.

15. A system for dynamic content delivery, comprising:
a facial direction detector implemented by a processor and configured for determining a changing field of view of a viewer based on sensor data from one or more sensors that capture information of the viewer at a source location, wherein the viewer is initially consuming content of a program on a first content display device;
a projector plane pose adjuster implemented by a processor and configured for setting up a pose of a second content display medium in accordance with the changing field of the view of the viewer, wherein the second content display medium is to be used to display the content to the viewer within the changing field of view;
one or more projectors configured for presenting the content of the program on the second content display medium so that the content is delivered to the viewer in accordance with the changing field of view of the viewer; and
a projector controller implemented by a processor and configured for:
selecting one of the one or more projectors with respect to the pose of the second content display medium, and
adjusting the pose of the selected projector based on the pose of the second content display medium.

16. The system of claim 15, wherein the source location is determined by a request location determiner configured for:
receiving a signal instructing to display the content in accordance with dynamically changing field of view of the viewer;
analyzing the signal to determine the source location from where the signal is transmitted by the viewer.

17. The system of claim 15, wherein
the first content display device is a television; and
the second content display medium is a projection surface.

18. The system of claim 15, wherein the facial direction detector determines a changing field of view by:
receiving the sensor data from the one or more sensors;
identifying facial features of the viewer from the sensor data;
determining a face orientation of the viewer based on the facial features; and
estimating the changing field of view of the viewer based on the face orientation of the viewer.

19. The system of claim 18, wherein the projector plane pose adjuster sets up a pose of a second content display medium by:
determining a distance between the viewer and the second content display medium;
selecting a location for the second content display medium based on the source location, the distance, and the changing field of view; and
configuring the pose of the second content display medium in accordance with the face orientation of the viewer and the changing field of view, wherein the second content display medium is configured to be substantially parallel with the face orientation of the viewer.

20. The system of claim 15, wherein the projector controller is further configured for:
adjusting the pose of a reflection surface associated with the selector projector based on the pose of the second content display medium to ensure that when
the selected projector transmits signals determined based on the content to the reflection surface, the reflection surface reflects the signals projected thereon in accordance with the angle
to the second content display medium so that the content is visible to the viewer on the second content display medium.

* * * * *